US011778628B2

(12) United States Patent
Wang et al.

(10) Patent No.: US 11,778,628 B2
(45) Date of Patent: Oct. 3, 2023

(54) SIDELINK CANCELLATION INDICATION FOR SIDELINK CHANNELS

(71) Applicant: QUALCOMM Incorporated, San Diego, CA (US)

(72) Inventors: Xiaojie Wang, Hillsborough, NJ (US); Xiaoxia Zhang, San Diego, CA (US); Piyush Gupta, Bridgewater, NJ (US); Jing Sun, San Diego, CA (US); Junyi Li, Fairless Hills, PA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/450,395

(22) Filed: Oct. 8, 2021

(65) Prior Publication Data

US 2023/0112319 A1    Apr. 13, 2023

(51) Int. Cl.
*H04W 72/10*     (2009.01)
*H04W 72/23*     (2023.01)

(52) U.S. Cl.
CPC .................. *H04W 72/23* (2023.01)

(58) Field of Classification Search
CPC .................................................. H04W 72/042
See application file for complete search history.

(56) References Cited

U.S. PATENT DOCUMENTS

| | | | |
|---|---|---|---|
| 2021/0037549 A1 | 2/2021 | Akkarakaran et al. | |
| 2021/0385822 A1* | 12/2021 | Chae | H04W 72/02 |
| 2022/0174682 A1* | 6/2022 | Li | H04W 72/10 |

FOREIGN PATENT DOCUMENTS

WO    2021146683 A1    7/2021

OTHER PUBLICATIONS

International Search Report and Written Opinion—PCT/US2022/075085—ISA/EPO—dated Dec. 5, 2022.

* cited by examiner

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information including a sidelink cancellation indication indicating a cancellation of a communication in a communication resource that has an overlap with a physical sidelink control channel. The UE may transmit on the communication resource in accordance with the sidelink cancellation indication and a rule associated with the overlap with the physical sidelink control channel. Numerous other aspects are described.

30 Claims, 12 Drawing Sheets

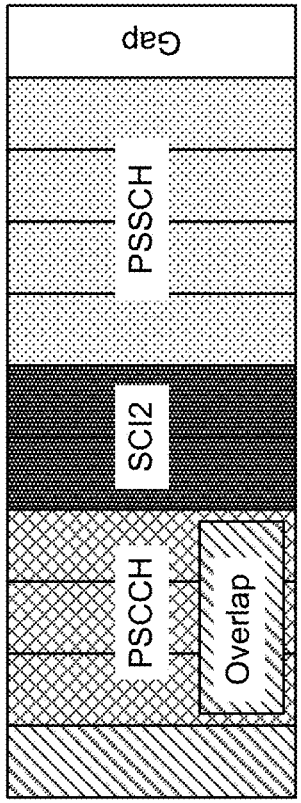
FIG. 7B
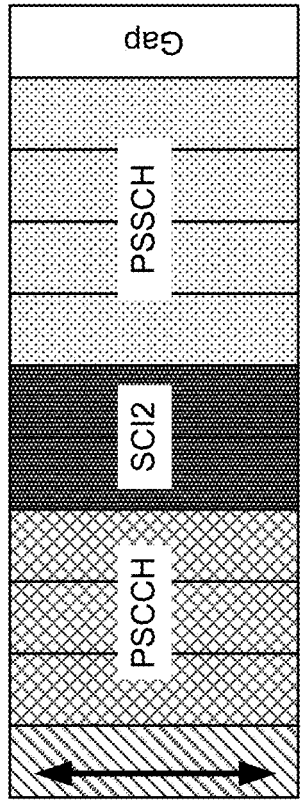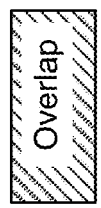
FIG. 7C

SIDELINK CANCELLATION INDICATION FOR SIDELINK CHANNELS

FIELD OF THE DISCLOSURE

Aspects of the present disclosure generally relate to wireless communication and to techniques and apparatuses for sidelink cancellation indication for sidelink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving downlink control information including a sidelink cancellation indication indicating a cancellation of a communication in a communication resource that has an overlap with a physical sidelink control channel. The method may include transmitting on the communication resource in accordance with the sidelink cancellation indication and a rule associated with the overlap with the physical sidelink control channel.

Some aspects described herein relate to a UE for wireless communication. The user equipment may include a memory and one or more processors coupled to the memory. The one or more processors may be configured to receive downlink control information including a sidelink cancellation indication indicating a cancellation of a communication in a communication resource that has an overlap with a physical sidelink control channel. The one or more processors may be configured to transmit on the communication resource in accordance with the sidelink cancellation indication and a rule associated with the overlap with the physical sidelink control channel.

Some aspects described herein relate to a non-transitory computer-readable medium that stores a set of instructions for wireless communication by a UE. The set of instructions, when executed by one or more processors of the UE, may cause the UE to receive downlink control information including a sidelink cancellation indication indicating a cancellation of a communication in a communication resource that has an overlap with a physical sidelink control channel. The set of instructions, when executed by one or more processors of the UE, may cause the UE to transmit on the communication resource in accordance with the sidelink cancellation indication and a rule associated with the overlap with the physical sidelink control channel.

Some aspects described herein relate to an apparatus for wireless communication. The apparatus may include means for receiving downlink control information including a sidelink cancellation indication indicating a cancellation of a communication in a communication resource that has an overlap with a physical sidelink control channel. The apparatus may include means for transmitting on the communication resource in accordance with the sidelink cancellation indication and a rule associated with the overlap with the physical sidelink control channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7D are diagrams illustrating examples associated with sidelink cancellation indication during physical sidelink control channel overlap scenarios, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
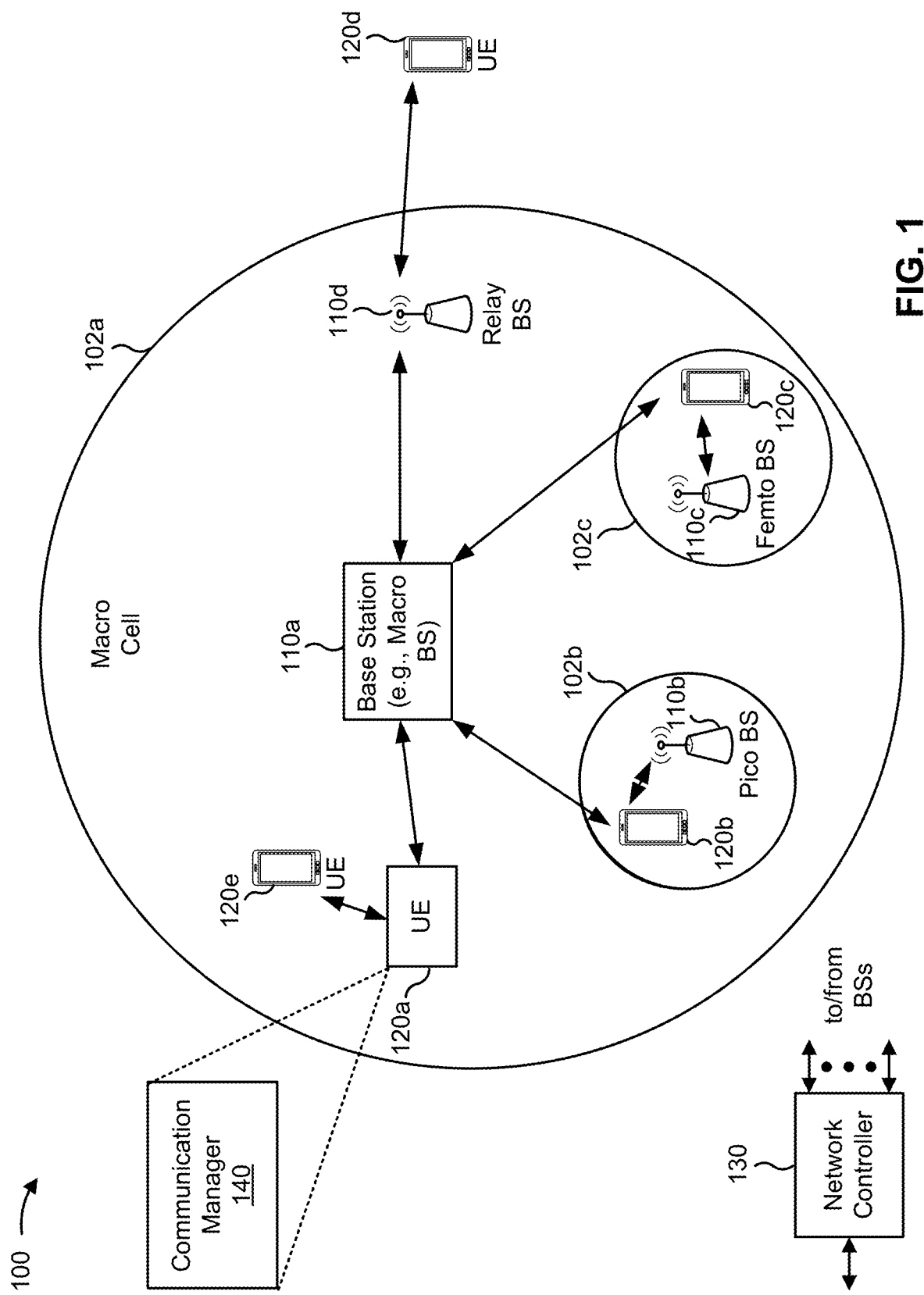
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. One example of an IoT device is an Industrial IoT (IIoT) device. IIoT devices may include, for example, programmable logic controllers (PLCs) coupled with sensors or actuators (SAs) to enable IIoT communications. For example, a single PLC may control between 20 and 50 SAs, in one example. IIoT devices may have constraints in terms of bandwidth and processing power capabilities and may avoid monitoring all transmissions to conserve power resources and processing resources.

Some IIoT applications may utilize relatively strict latency and reliability requirements, such as a 1 to 2 millisecond (ms) latency requirement and a 10e-6 error rate requirement. One example of a service that specifies a latency and reliability requirement is ultra-reliable low-latency communication (URLLC) service. IIoT applications may have relatively small packet sizes of, for example, between 32 and 256 bytes and may have low bandwidth needs, such as needing only 2 resource blocks (RBs) for communication. However, because an IIoT deployment may include tens, hundreds, thousands, or hundreds of thousands of deployed devices, an overall bandwidth need may be relatively large for an IIoT deployment and may be met using dedicated frequency bands or communication in unlicensed frequency bands.

Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive downlink control information including a sidelink cancellation indication indicating a cancellation of a communication in a communication resource that has an overlap with a physical sidelink control channel; and transmit on the communication resource in accordance with the sidelink cancellation indication and a rule associated with the overlap with the physical sidelink control channel. Additionally, or alternatively, the communication manager 140 may perform one or more other operations described herein.

As indicated above, FIG. 1 is provided as an example. Other examples may differ from what is described with regard to FIG. 1.

Figure 2:
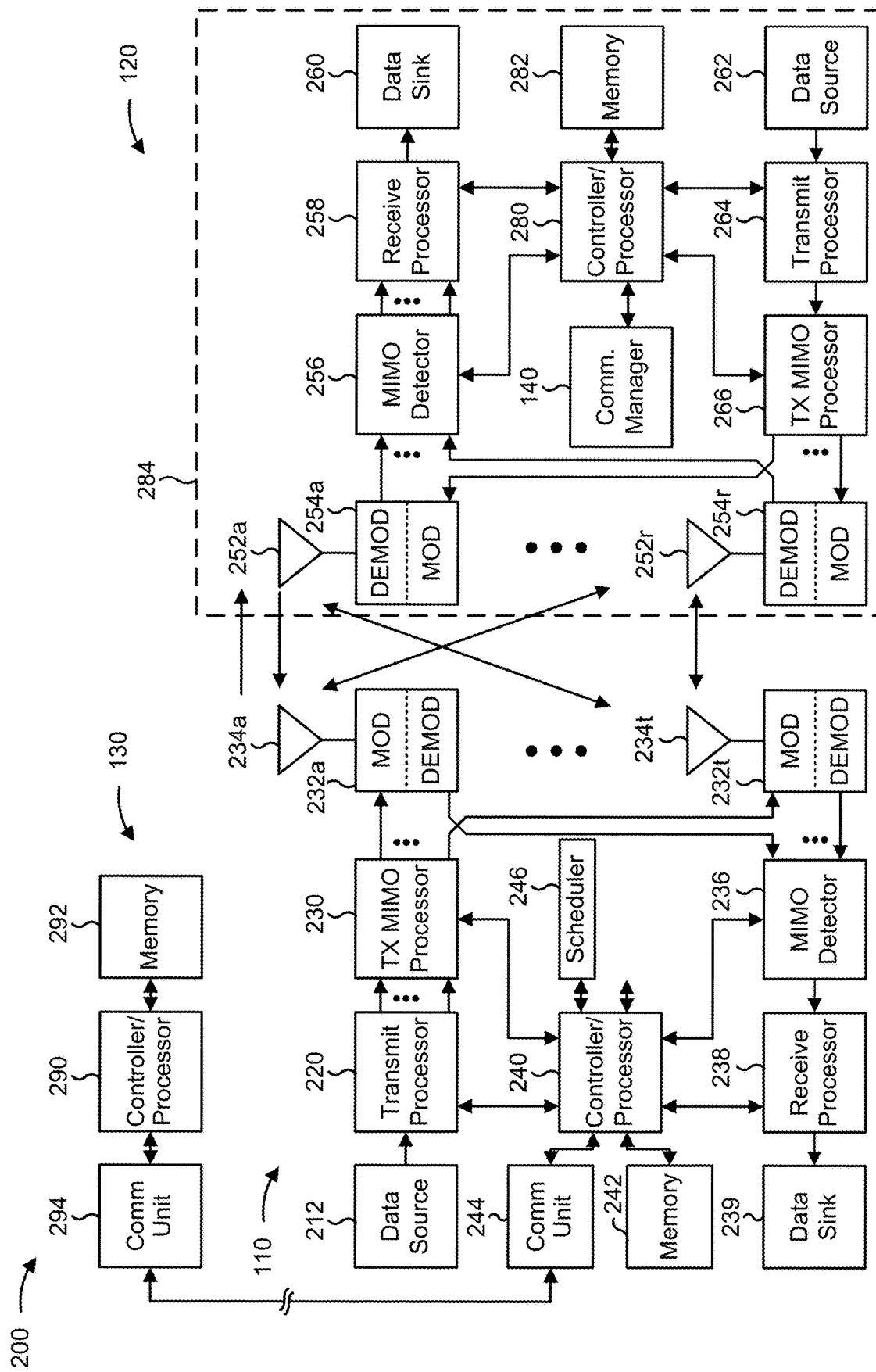
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-9).

The controller/processor 240 of the base station 110, the controller/processor 280 of the UE 120, and/or any other component(s) of FIG. 2 may perform one or more techniques associated with sidelink cancellation indication during physical sidelink control channel overlap scenarios, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some examples, executing instructions may include running the instructions, converting the instructions, compiling the instructions, and/or interpreting the instructions, among other examples.

In some aspects, a UE (e.g., the UE 120) includes means for receiving downlink control information including a sidelink cancellation indication indicating a cancellation of a communication in a communication resource that has an overlap with a physical sidelink control channel; and/or means for transmitting on the communication resource in accordance with the sidelink cancellation indication and a rule associated with the overlap with the physical sidelink control channel. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
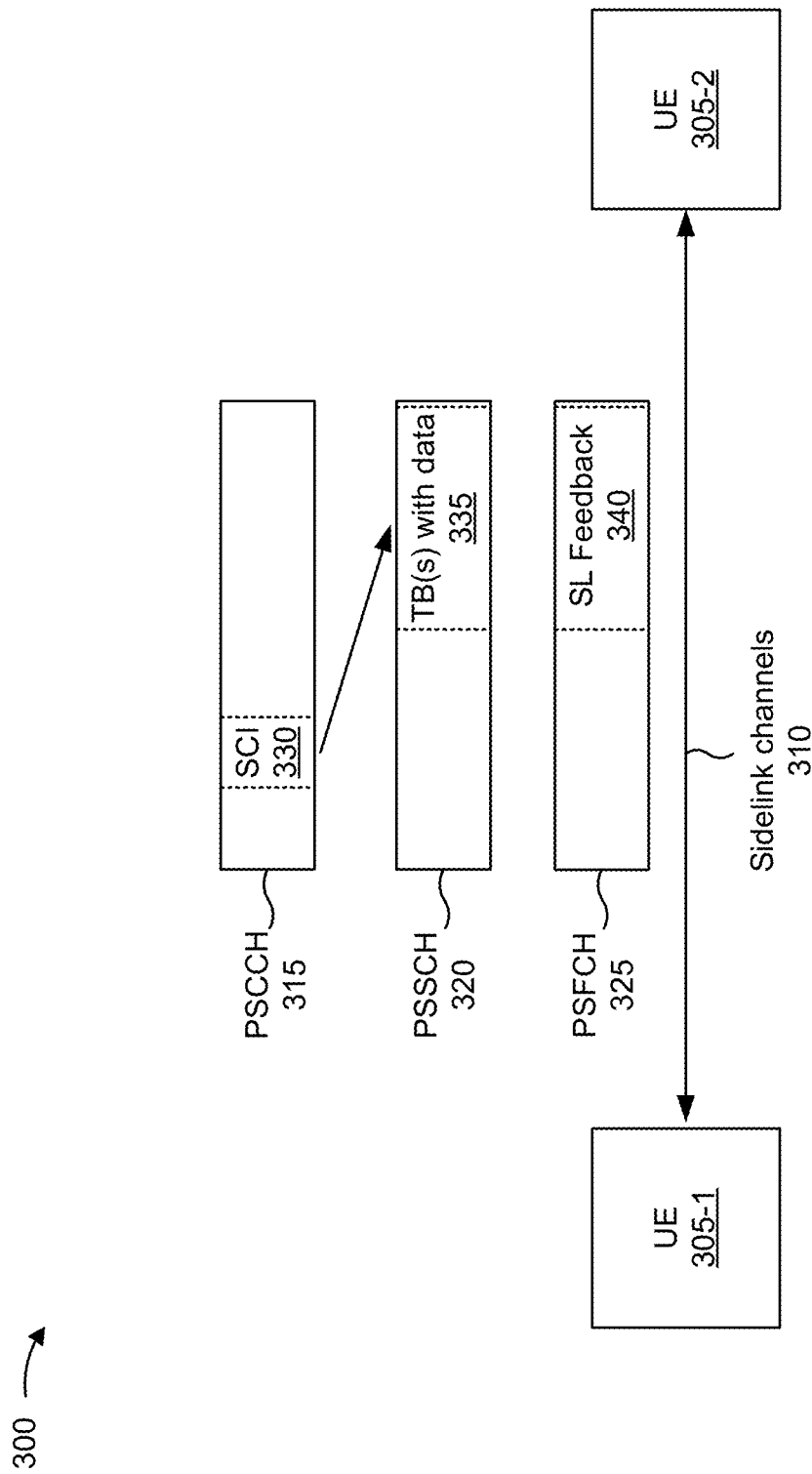
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, cellular V2X (C-V2X) communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The sidelink channels 310 may be divided into a particular quantity of subchannels, such as subchannels occupying 10, 15, 20, 25, 50, 75, or 100 physical resource blocks (PRBs), among other examples. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The PSCCH 315 may be configured to occupy a particular quantity of PRBs, such as 10, 12, 15, 20, or 25 PRBs, among other examples. The PSSCH 320 may be configured with a duration of a particular quantity of symbols, such as 2 or 3 symbols, among other examples. The PSSCH 320 may occupy at least 1 subchannel and may convey second stage SCI (SCI-2), as described in more detail herein. The TB(s) 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and an SCI-2. The SCI-1 may be transmitted on the PSCCH 315. The SCI-2 may be transmitted on the PSSCH 320. The SCI-1 may include, for example, an indication of one or more resources (e.g., a resource bandwidth, time resources, frequency resources, and/or spatial resources) on the PSSCH 320, information for decoding sidelink communications on the PSSCH (e.g., a source identifier and/or a destination identifier to use to identify SCI-2), a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger. UE 305-2 may receive the SCI-2 after decoding the PSCCH (e.g., using a decoded source identifier and destination identifier to determine whether a received packet is for UE 305-2 and whether the received packet is from UE 305-1).

UE 305-1 may transmit, and UE 305-2 may receive, different formats of SCI 330 in a sidelink channel. For example, SCI 1_0 in a PSCCH may include a frequency domain resource allocation (FDRA) of $$\left\lceil \log \frac{N_{subchannel}^{SL}(N_{subchannel}^{SL}+1)}{2} \right\rceil$$

for 2 resource reservations and may include an FDRA of $$\left\lceil \log \frac{N_{subchannel}^{SL}(N_{subchannel}^{SL}+1)(2N_{subchannel}^{SL}+1)}{6} \right\rceil$$

for 3 resource reservations, where $N_{subchannel}^{SL}$ represents a quantity of contiguous subchannels. Similarly, SCI 1_0 may be associated with a time domain resource allocation (TDRA) of 5 bits for 2 resource reservations and a TDRA of 9 bits for 3 resource reservations.

As an example of an SCI-1 in sidelink communications, an SCI-1 on a PSCCH may include a priority indication (e.g., 3 bits), a frequency resource assignment (e.g., with a quantity of bits based at least in part on a quantity of slot reservations and/or subchannels), a time resource assignment (e.g., 5 or 9 bits for 2 or 3 reservations, respectively), a resource reservation period assignment (e.g., with a quantity of bits based at least in part on a quantity of allowable periods), an identified DMRS pattern (e.g., with a quantity of bits based at least in part on a quantity of configured DMRS patterns), an SCI-2 format indicator (e.g., 2 bits), a beta offset for SCI-2 rate matching (e.g., 2 bits), a DMRS port indicator (e.g., 1 bit indicating one or two data layers), an MCS indicator (e.g., 5 bits), an MCS table identifier (e.g., 0 to 2 bits), a PSFCH overhead indicator (e.g., 0 or 1 bit), and one or more reserved bits for upper layer indicators. This SCI-1 may be decoded by an intended destination UE (e.g., UE 305-2) and may be decoded by one or more other UEs that are performing channel sensing to avoid resource collisions. Further to the example, an SCI-2 on a PSSCH may include a HARQ identifier (e.g., a quantity of bits based at least in part on a quantity of configured HARQ processes), an NDI (e.g., 1 bit), a redundancy version identifier (RV-ID) (e.g., 2 bits), a source identifier (e.g., 8 bits), a destination identifier (e.g., 16 bits), a HARQ enablement indicator (e.g., 1 bit), and a set of SCI-2 type-specific fields (e.g., for SCI-2-A, a 2 bit cast type field and a 1 bit CSI request field, and for SCI-2-B, a 12 bit zone identifier and a 4 bit communication range identifier). This SCI-2 may be decoded by an intended destination UE (e.g., UE 305-2), among other examples.

In some aspects, the one or more sidelink channels 310 may use resource pools. For example, a scheduling assignment (e.g., included in SCI 330) may be transmitted in subchannels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs. Subchannels of sidelink channel 310 may be indexed from 1-27 in a resource pool. A size of PSCCH 320 may be fixed in the resource pool (e.g., between 10% and 100% of one subchannel, thereby representing a first 2 or 3 symbols).

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter)

associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

To receive a packet on sidelink channel 310 in, for example, C-V2X, UE 305-2 performs blind decoding on all sidelink subchannels in a particular slot. For example, UE 305-2 may perform blind decoding on between 1 and 27 subchannels. Each subchannel may be 10 resource blocks (RBs) or greater. The particular slot may include both a PSCCH transmission and a PSSCH transmission. The PSSCH transmission may occupy up to a first threshold ($N_{subchannel}^{SL}$) of contiguous subchannels and the PSCCH may occupy a single subchannel with a lowest subchannel index.

As indicated above, FIG. 3 is provided as an example. Other examples may differ from what is described with respect to FIG. 3.

Figure 4:
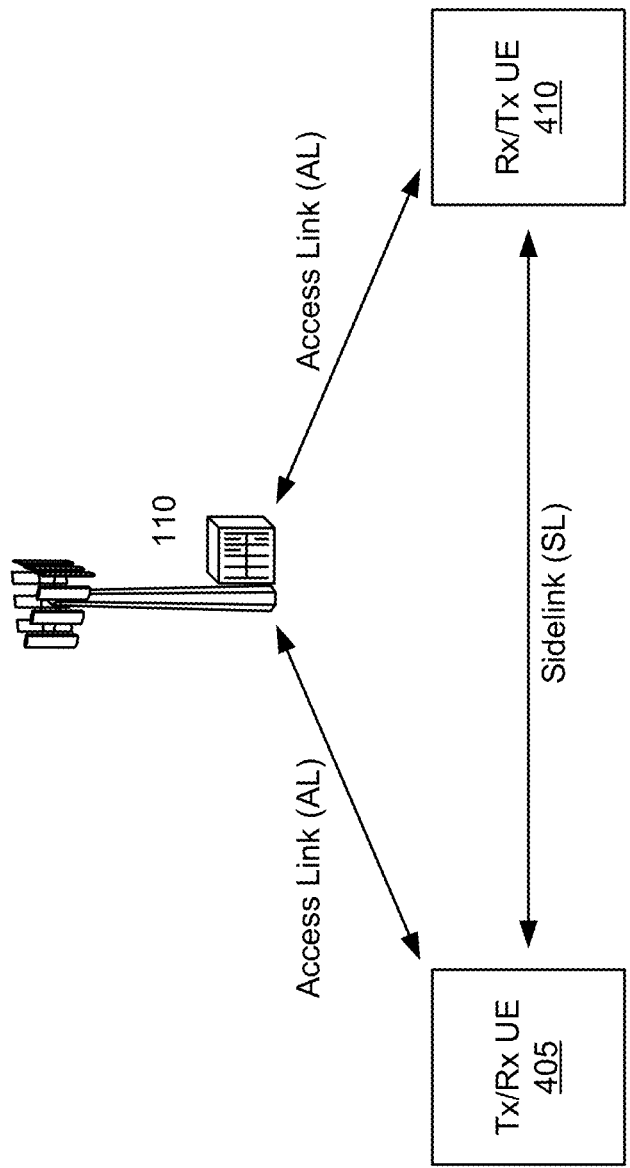
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Different resource allocation modes may be possible in sidelink communication deployments. For example, in a first resource allocation mode, base station 110 may assign Tx resources to Tx/Rx UE 405 using DCI 3_0. The first resource allocation mode may support dynamic grant (DG) allocation, configured grant (CG) type-1 allocation, or CG type-2 allocation, among other examples. Base station 110 may transmit the DCI 3_0 (e.g., on a Uu interface) to allocate the Tx resources (e.g., for transmission on a PC5 interface) and to indicate a transmission timing for the Tx resources. Tx/Rx UE 405 may configure a modulation and coding scheme (MCS) for the Tx resources in accordance with a maximum MCS set by base station 110. As another example, in a second resource allocation mode, Tx/Rx UE 405 may (autonomously) determine resources for sidelink communications. For example, Tx/Rx UE 405 may perform channel sensing by blindly decoding all available PSCCH channels to determine whether one or more resources are available or are reserved for other sidelink communications. Tx/Rx UE 405 may report available resources from a lower layer that identifies the available resources to an upper layer (e.g., an application layer) that may select one or more available resources to use for communication.

As indicated above, FIG. 4 is provided as an example. Other examples may differ from what is described with respect to FIG. 4.

Figure 5A:
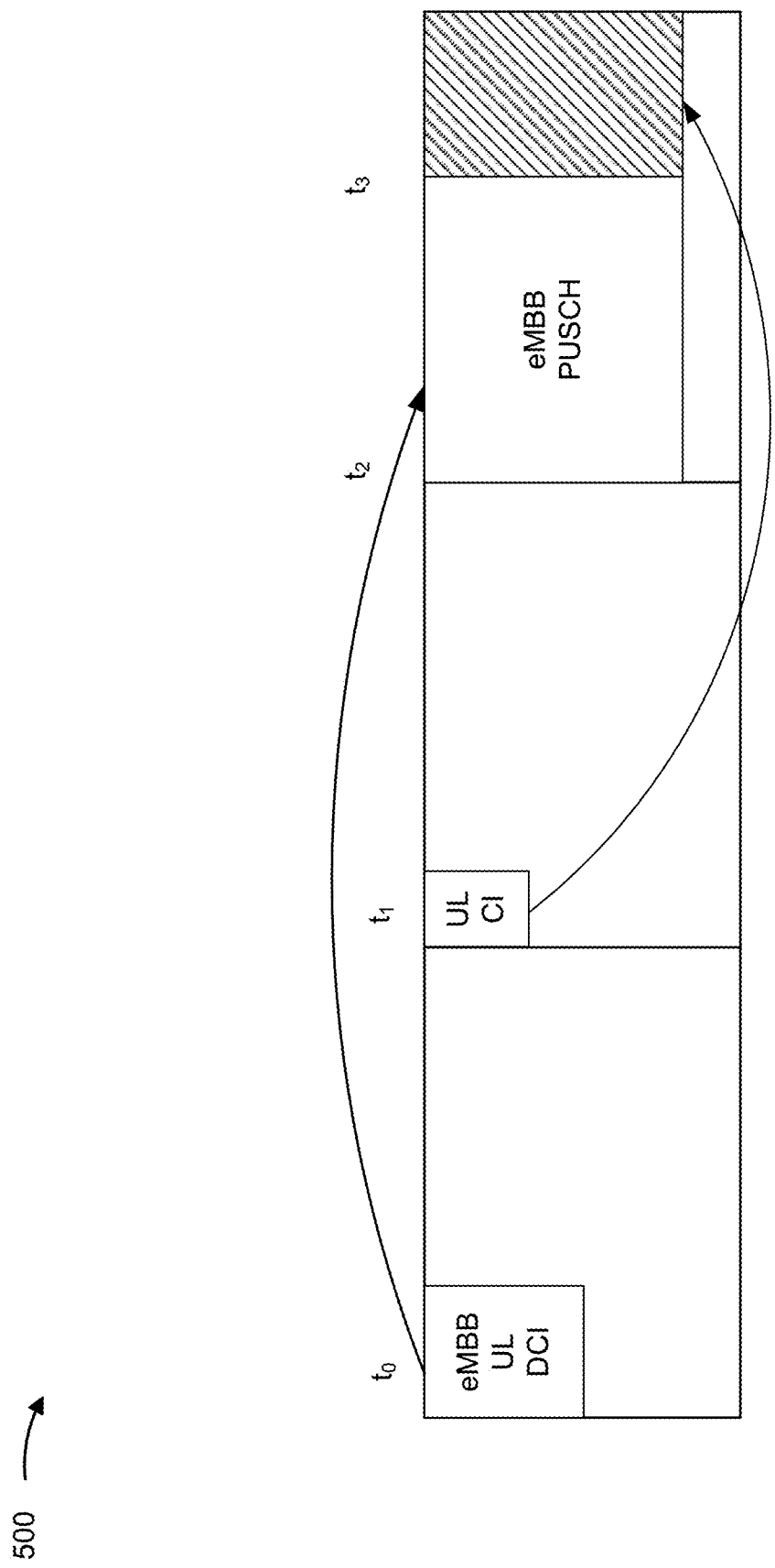
FIGS. 5A and 5B are diagrams illustrating an example of an uplink cancellation indication, in accordance with the present disclosure.
Figure 5B:
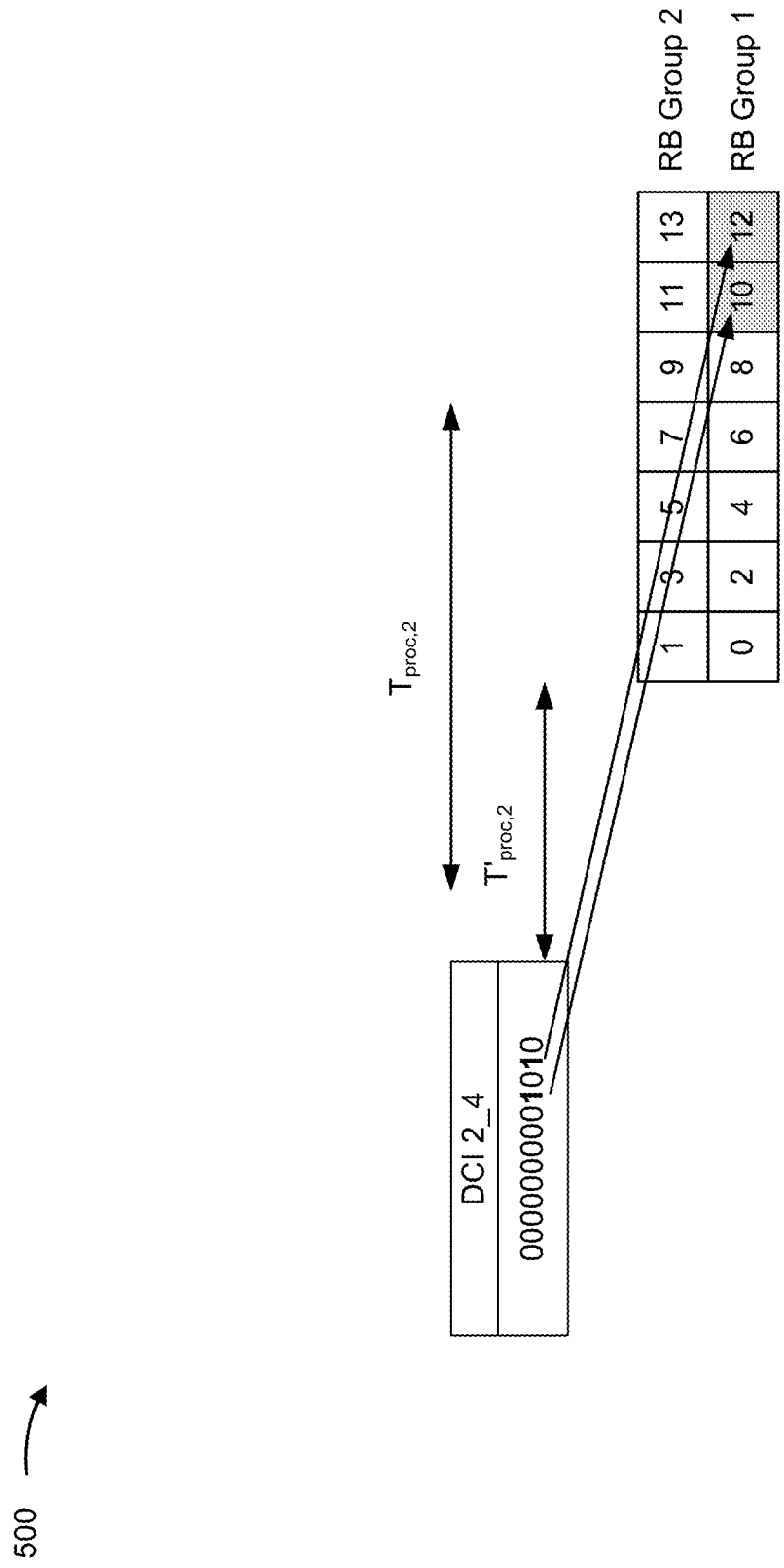

FIGS. 5A and 5B are diagrams illustrating an example 500 of uplink cancellation indication, in accordance with the present disclosure.

As shown in FIG. 5A, an uplink (UL) DCI may be used to schedule an uplink channel, such as a physical uplink shared channel (PUSCH). For example, a base station may transmit the UL DCI (on a downlink) at a time $t_0$ to a UE to schedule resources for the UE to use for transmission (on an uplink) of a PUSCH at time $t_2$. One example of a service in which UL DCIs may be used to schedule PUSCH is enhanced mobile broadband (eMBB), which allows for high data rates over a wide coverage area.

As further shown in FIG. 5A, at a time $t_1$, the UE may receive an uplink cancellation indication (CI). For example, the base station may transmit the uplink cancellation indication via a group-common physical downlink control channel (GC-PDCCH) DCI 2_4 scrambled using a cancellation indication radio network temporary identifier (CI-RNTI). The cancellation indication may apply to the PUSCH at a time $t_3$, causing the UE to cancel transmission of the PUSCH after $t_3$. A gap between $t_1$ and $t_3$ may be based at least in part on a processing time of the cancellation indication. In some cases, the cancellation indication may apply to a specified set of transmissions, such as a PUSCH, a repetition of a PUSCH, or a sounding reference signal. In some cases, the cancellation indication may apply based at least in part on a prioritization, such as only applying to low-priority (LP) PUSCH transmissions.

By transmitting the uplink cancellation indication, the base station enables prioritization of a resource, which was allocated for the PUSCH, for use with another service that is to be prioritized over eMBB service. For example, the base station may transmit the UL DCI to schedule the PUSCH on a particular resource for eMBB service but may later determine that the particular resource is needed to satisfy a latency requirement or a reliability requirement associated with URLLC service. In this way, by transmitting the uplink cancellation indication, the base station allows reallocation of the particular resource to the URLLC service, thereby enabling the UE to satisfy the latency requirement or the reliability requirement of the URLLC service.

As shown in FIG. 5B, the DCI 2_4 payload may identify a resource that is to be preempted in connection with the uplink cancellation indication. For example, the DCI 2_4 may include 14 bits of payload for each serving cell and may include two bits indicating two symbols (10 and 12) in a particular resource block group (RB Group 1) that are preempted. In some cases, a time region and frequency resource region to which the DCI 2_4 applies is radio resource control (RRC) configured. As shown, a first symbol to which DCI 2_4 applies occurs a time $T'_{proc,2}$ after a last symbol of DCI 2_4, and a first symbol that is preempted occurs at least $T_{proc,2}$ after the last symbol of DCI 2_4. However, the uplink cancellation indication only applies to access link channels, such as a PUSCH. In sidelink communications systems, it may be advantageous to allow cancellation of a first sidelink communication to allow a resource to be used for a second communication.

As indicated above, FIGS. 5A and 5B are provided as an example. Other examples may differ from what is described with respect to FIGS. 5A and 5B.

Figure 6:
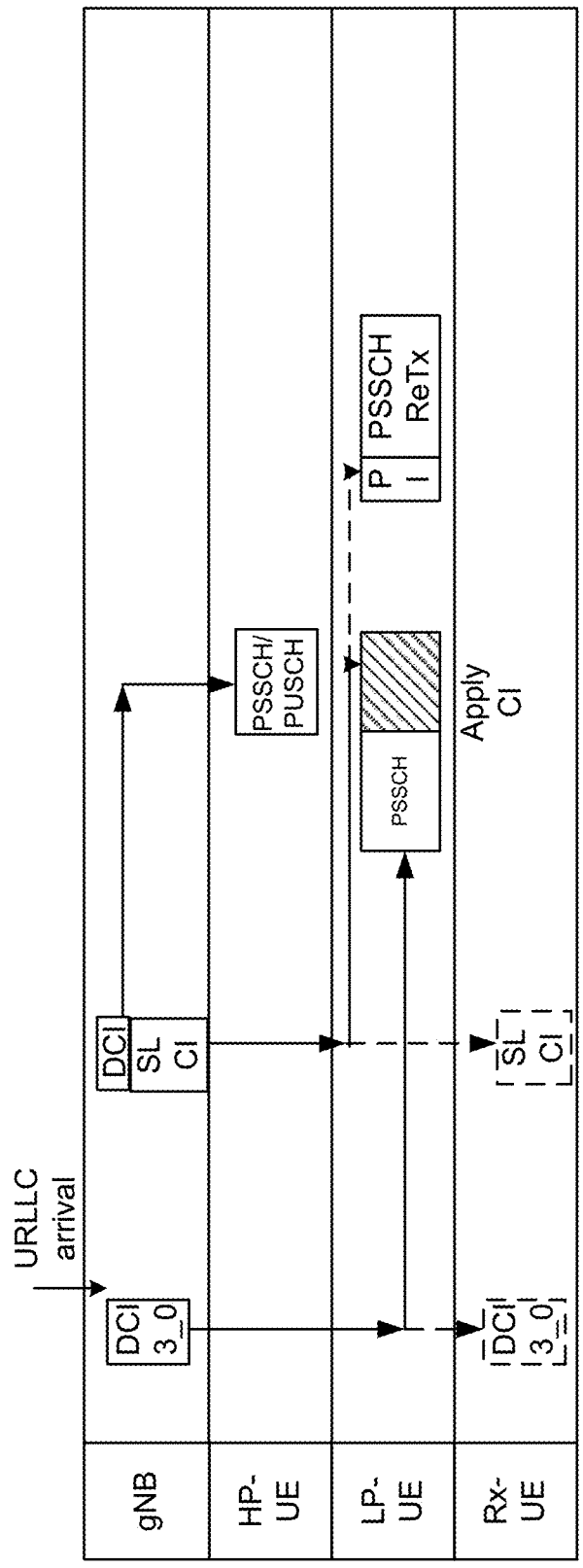
FIG. 6 is a diagram illustrating an example of a sidelink cancellation indication, in accordance with the present disclosure.

FIG. 6 is a diagram illustrating an example 600 of a sidelink cancellation indication, in accordance with the present disclosure.

As shown in FIG. 6, a gNB (a base station) transmits a DCI 3_0 to a low priority UE (LP-UE) and an Rx-UE to identify a resource reservation for the LP-UE to transmit to the Rx-UE. The DCI 3_0 may schedule low priority sidelink traffic or sidelink retransmissions, among other examples. After transmission of the DCI 3_0, the gNB may detect arrival of URLLC traffic that is to be transmitted using the same resource for which the resource reservation of the DCI 3_0 applied. The gNB may transmit a DCI to a high priority UE (HP-UE) to schedule a physical sidelink shared channel or a physical uplink shared channel for transmission of the URLLC traffic. The gNB may transmit a sidelink cancellation indication (SL CI) to the LP-UE and the Rx-UE to preempt transmission in the resource reservation of DCI 3_0. Here, the LP-UE applies the CI and ends transmission of a PSSCH to the Rx-UE before an end of the resource reservation of the DCI 3_0 to allow the HP-UE to use the remainder of the resource reservation of the DCI 3_0 for transmission of the PSSCH or PUSCH, among other examples. At a subsequent time, the LP-UE may retransmit (ReTx) the PSSCH. In this way, the LP-UE and Rx-UE manage a cancellation indication occurring in an overlapping resource of a PSSCH.

As indicated above, FIG. 6 is provided as an example. Other examples may differ from what is described with respect to FIG. 6.

Some aspects described herein specify UE behavior when a cancellation indication applies to a resource that has an overlap with a PSCCH. For example, a sidelink cancellation indication may not be permitted to cancel one or more symbols of a PSSCH or PSCCH when the sidelink cancellation indication applies to a resource that has an overlap with a PSCCH. Alternatively, the sidelink cancellation indication may cancel all or a portion of a PSCCH or PSSCH when applicable to a resource that has an overlap with a PSCCH. In some aspects, a UE may adjust a transmission configuration to transmit in accordance with the sidelink cancellation indication, such as by cancelling a transmission, shifting a transmission, delaying a transmission, or transmitting only a portion of a transmission, among other examples. In this way, the UE can allow application of sidelink cancellation indications for resources overlapping with a PSCCH, thereby providing improved communication flexibility for some services, such as URLLC among other examples.

FIGS. 7A-7D are diagrams illustrating an example 700 associated with sidelink cancellation indication during physical sidelink control channel overlap scenarios, in accordance with the present disclosure. As shown in FIGS. 7A-7D, example 700 includes communication between a base station 110 and a set of UEs 120. In some aspects, base station 110 and the set of UEs 120 may be included in a wireless network, such as wireless network 100.

Figure 7A:
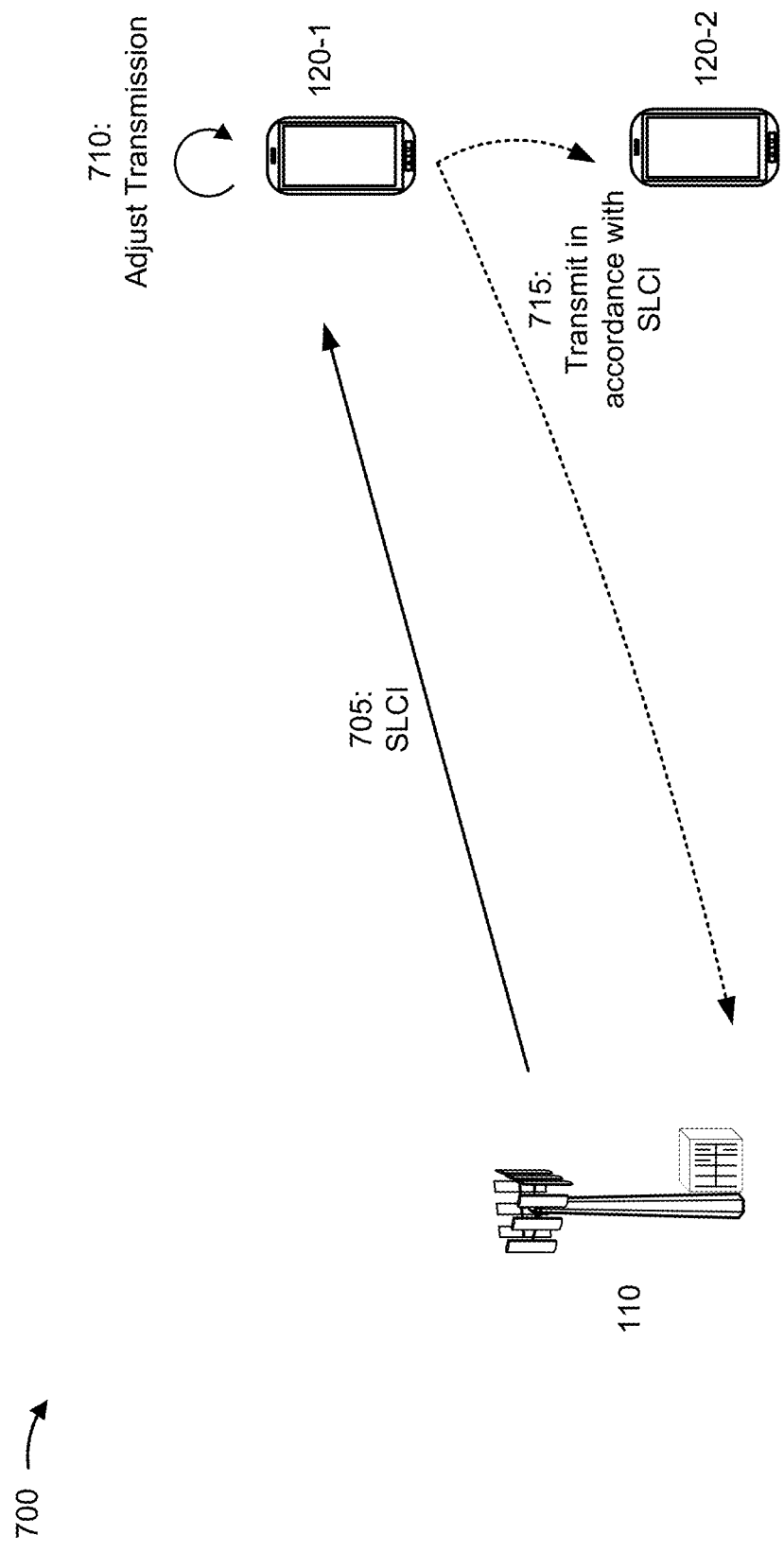

As shown in FIG. 7A, and by reference number 705, UE 120-1 may receive a sidelink cancellation indication from base station 110. For example, UE 120-1 may receive a sidelink cancellation indication that applies to a resource overlapping with a PSCCH.

As further shown in FIG. 7A, and by reference numbers 710 and 715, UE 120-1 may adjust a transmission configuration and transmit using the adjusted transmission configuration. For example, UE 120-1 may adjust the transmission configuration, cancel some transmissions, or transmit other transmissions, among other examples, in accordance with the sidelink cancellation indication.

In some aspects, UE 120-1 may determine to transmit a PSSCH without cancellation. For example, the sidelink cancellation indication may specify to not cancel any PSSCH symbol, which may include a first 2 or 3 symbols of a communication resource, excluding one or more symbols specified for automatic gain control (AGC). In contrast, in some aspects, UE 120-1 may determine to cancel an entirety of a PSCCH transmission and/or a PSSCH transmission based at least in part on the sidelink cancellation indication implicating a resource that has an overlap with the PSCCH. For example, when an amount of time between the last symbol of the sidelink cancellation indication and a PSSCH or PSCCH resource is greater than a threshold (e.g., greater than $T_{proc}$, as described herein), UE 120-1 may cancel an entirety of a PSCCH transmission and/or a PSSCH transmission associated with the PSCCH transmission. In some cases, UE 120-1 may also cancel transmission of one or more signals associated with AGC in connection with cancelling an entirety of a PSCCH transmission and/or a PSSCH transmission.

In some aspects, UE 120-1 may cancel a whole subchannel or resource block transmission that includes the overlapped PSCCH. For example, as shown in FIG. 7B, when the cancellation indication identifies a resource in a PSCCH subchannel, UE 120-1 may cancel transmission in the subchannel. In this case, UE 120-1 may determine to forgo transmission on a lowest subchannel or resource block that includes a PSCCH. Furthermore, in this case, UE 120-1 may determine whether to transmit symbols before the PSCCH based at least in part on a timing of the sidelink cancellation indication.

In some aspects, UE 120-1 may cancel a PSCCH transmission (e.g., an entirety of the PSCCH transmission), and may determine to transmit a PSSCH. For example, UE 120-1 may determine to continue with transmission of a PSSCH that does not overlap with a resource identified in the cancellation indication but when the identified resource does overlap with a PSCCH. In this case, UE 120-1 may adjust a power configuration of resource elements associated with symbols of the PSSCH. For example, UE 120-1 may boost a transmit power of the resource elements. Additionally, or alternatively, UE 120-1 may determine to add an additional reference signal for the PSSCH to maintain phase continuity in the resource elements.

In some aspects, UE 120-1 may determine to shift a transmission based at least in part on identifying an overlap of a resource in the sidelink cancellation indication and the PSCCH. For example, as shown by FIG. 7C, when a PSSCH is allocated across a first subchannel 0 and a second subchannel 1, UE 120-1 may forgo transmission on the lowest subchannel and may shift all transmission to respective higher subchannels within a PSSCH allocation (e.g., from subchannel 0 to subchannel 1, from subchannel 1 to subchannel 2, among other examples). In this case, UE 120-1 may still transmit on the lowest subchannel (e.g., subchannel 0) based at least in part on a timing of the sidelink cancellation indication. For example, UE 120-1 may still perform an AGC transmission based at least in part on the AGC transmission being scheduled within a threshold time (e.g., $T_{proc}$) of the sidelink cancellation indication.

Figure 7D:
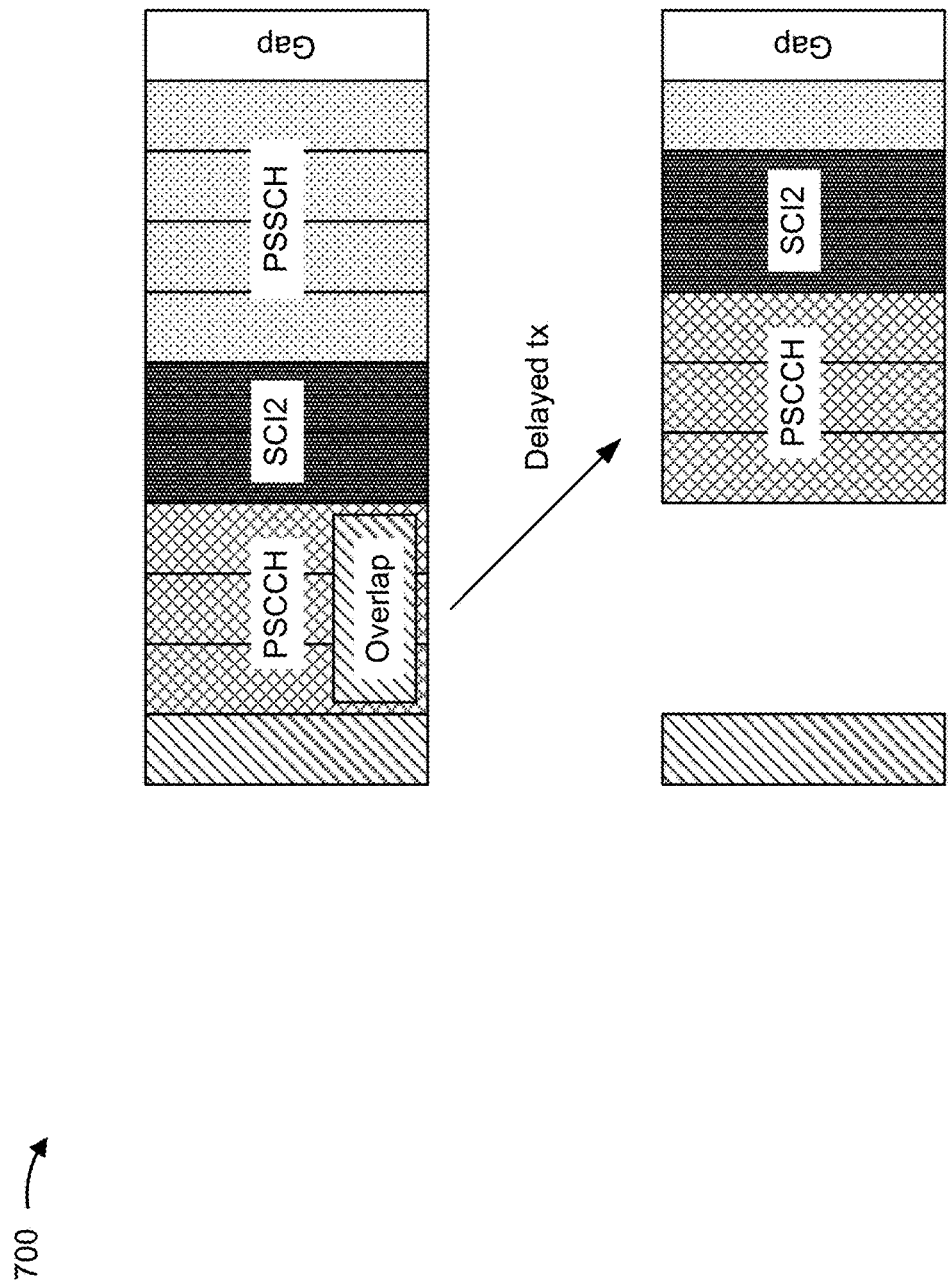

In some aspects, UE 120-1 may delay a transmission based at least in part on identifying an overlap of a resource in the sidelink cancellation indication and the PSCCH. For example, as shown in FIG. 7D, UE 120-1 may delay PSCCH transmission and one or more subsequent transmissions to non-overlapping symbols. In this case, UE 120-1 may cancel a portion or all of a PSSCH transmission to accommodate delaying the PSCCH (and/or an SCI-2 transmission). Similarly, UE 120-1 may determine to shift or cancel an AGC symbol to accommodate the delay of the PSCCH and/or SCI-2.

In some aspects, UE 120-1 may cancel a portion of a PSCCH transmission that overlaps in frequency with another transmission indicated by the sidelink cancellation indication. For example, UE 120-1 may cancel some or all of the PSCCH transmission that overlaps in frequency with another transmission. In some aspects, UE 120-1 may transmit the cancelled portion of the PSCCH transmission in one or more non-overlapping subchannels. In this case, UE 120-1 may include one or more additional reference signals to maintain phase-continuity when cancelling the portion of the PSCCH transmission.

In some aspects, UE 120-1 may cancel one or more PSCCH symbols that overlap with another transmission indicated by the sidelink cancellation indication. For example, UE 120-1 may cancel transmission of both a PSCCH and PSSCH on the overlapping symbols. Additionally, or alternatively, UE 120-1 may cancel all symbols of the PSCCH when any symbol overlaps with a resource identified by the sidelink cancellation indication. Alternatively, UE 120-1 may cancel only transmission on overlapping symbols and may transmit the PSCCH and/or PSSCH on non-overlapping symbols.

In some aspects, UE 120-1 may cancel a portion of a PSCCH transmission based at least in part on a size or characteristic of an overlapping region. For example, when an overlapping region (e.g., an amount of frequency resources and/or time resources) satisfies a threshold and there are no available time resources or frequency resources for PSCCH transmission, UE 120-1 may cancel all of a PSCCH or PSSCH transmission, cancel all transmissions on a subchannel or resource block that includes PSCCH transmission, or cancel all transmissions that include a PSCCH, among other examples, as described herein. Additionally, or alternatively, if the overlapping region satisfies the threshold and there are available time resources or frequency resources for PSCCH transmission, UE 120-1 may shift or delay PSCCH transmission, as described herein. Additionally, or alternatively, if an amount of available time between receiving the sidelink cancellation indication and adjusting a transmission exceeds a threshold amount for modifying a waveform, UE 120-1 may modify a waveform to cancel a PSCCH transmission only in an overlapping frequency or in one or more symbols, as described herein.

As indicated above, FIGS. 7A-7D are provided as one or more examples. Other examples may differ from what is described with respect to FIGS. 7A-7D.

Figure 8:
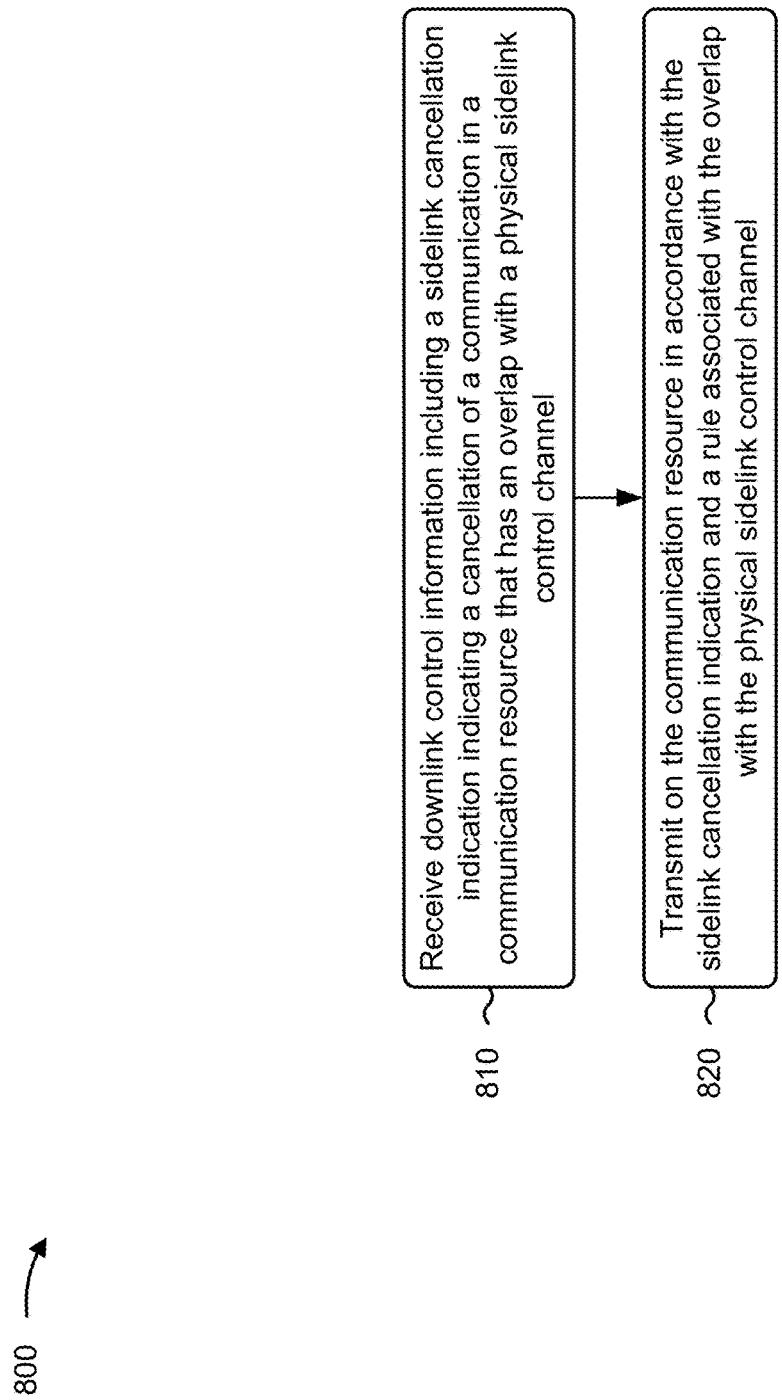
FIG. 8 is a diagram illustrating an example process associated with sidelink cancellation indication during physical sidelink control channel overlap scenarios, in accordance with the present disclosure.

FIG. 8 is a diagram illustrating an example process 800 performed, for example, by a UE, in accordance with the present disclosure. Example process 800 is an example where the UE (e.g., UE 120) performs operations associated with sidelink cancellation indication for sidelink channels during physical sidelink control channel overlap scenarios.

As shown in FIG. 8, in some aspects, process 800 may include receiving downlink control information including a sidelink cancellation indication indicating a cancellation of a communication in a communication resource that has an overlap with a physical sidelink control channel (block 810). For example, the UE (e.g., using communication manager 140 and/or reception component 902, depicted in FIG. 9) may receive downlink control information including a sidelink cancellation indication indicating a cancellation of a communication in a communication resource that has an overlap with a physical sidelink control channel, as described above.

As further shown in FIG. 8, in some aspects, process 800 may include transmitting on the communication resource in accordance with the sidelink cancellation indication and a rule associated with the overlap with the physical sidelink control channel (block 820). For example, the UE (e.g., using communication manager 140 and/or transmission component 904, depicted in FIG. 9) may transmit on the communication resource in accordance with the sidelink cancellation indication and a rule associated with the overlap with the physical sidelink control channel, as described above.

Process 800 may include additional aspects, such as any single aspect or any combination of aspects described below and/or in connection with one or more other processes described elsewhere herein.

In a first aspect, transmitting on the communication resource in accordance with the sidelink cancellation indication and the rule associated with the overlap with the physical sidelink control channel comprises transmitting on the communication resource such that one or more symbols of the physical sidelink control channel are not cancelled.

In a second aspect, alone or in combination with the first aspect, transmitting on the communication resource in accordance with the sidelink cancellation indication and the rule associated with the overlap with the physical sidelink control channel comprises canceling at least one of a physical sidelink control channel transmission, a physical sidelink shared channel transmission, or an automatic gain control transmission.

In a third aspect, alone or in combination with one or more of the first and second aspects, transmitting on the communication resource in accordance with the sidelink cancellation indication and the rule associated with the overlap with the physical sidelink control channel comprises canceling a subchannel or resource block that includes the physical sidelink control channel.

In a fourth aspect, alone or in combination with one or more of the first through third aspects, canceling the subchannel or resource block comprises canceling a transmission on a lowest subchannel or resource block that includes the physical sidelink control channel.

In a fifth aspect, alone or in combination with one or more of the first through fourth aspects, canceling the subchannel or resource block comprises canceling one or more symbols occurring before the physical sidelink control channel in connection with a timing of decoding of the sidelink cancellation indication.

In a sixth aspect, alone or in combination with one or more of the first through fifth aspects, canceling the subchannel or resource block comprises transmitting one or more symbols occurring before the physical sidelink control channel in connection with a timing of decoding of the sidelink cancellation indication.

In a seventh aspect, transmitting on the communication resource in accordance with the sidelink cancellation indication and the rule associated with the overlap with the physical sidelink control channel comprises canceling a complete physical sidelink control channel.

In an eighth aspect, alone or in combination with one or more of the first through seventh aspects, process 800 includes transmitting the physical sidelink control channel using another communication resource.

In a ninth aspect, alone or in combination with one or more of the first through eighth aspects, process 800 includes adjusting a transmit power or a reference signal configuration in one or more resource elements in connection with transmitting on the communication resource.

In a tenth aspect, alone or in combination with one or more of the first through ninth aspects, transmitting on the communication resource in accordance with the sidelink cancellation indication and the rule associated with the overlap with the physical sidelink control channel comprises forgoing transmission of the physical sidelink control channel on a first subchannel, and shifting transmissions on one or more second subchannels within a physical sidelink control channel allocation in connection with forgoing the transmission of the physical sidelink control channel on the first subchannel.

In an eleventh aspect, alone or in combination with one or more of the first through tenth aspects, transmitting on the communication resource in accordance with the sidelink cancellation indication and the rule associated with the overlap with the physical sidelink control channel comprises delaying transmission of the physical sidelink control channel.

In a twelfth aspect, alone or in combination with one or more of the first through eleventh aspects, transmitting on the communication resource in accordance with the sidelink cancellation indication and the rule associated with the overlap with the physical sidelink control channel comprises transmitting the physical sidelink control channel on one or more non-overlapping symbols.

In a thirteenth aspect, alone or in combination with one or more of the first through twelfth aspects, process 800 includes adjusting at least one of a demodulation reference signal sequence, an automatic gain control configuration, or a physical sidelink shared channel transmission in connection with delaying the transmission of the physical sidelink control channel.

In a fourteenth aspect, alone or in combination with one or more of the first through thirteenth aspects, transmitting on the communication resource in accordance with the sidelink cancellation indication and the rule associated with the overlap with the physical sidelink control channel comprises canceling transmission of the physical sidelink control channel in an overlapping frequency identified by the sidelink cancellation indication.

In a fifteenth aspect, alone or in combination with one or more of the first through fourteenth aspects, the cancelling of the transmission of the physical sidelink control channel is a partial cancellation or a full cancellation based at least in part on a characteristic of the overlapping frequency.

In a sixteenth aspect, alone or in combination with one or more of the first through fifteenth aspects, process 800 includes transmitting the physical sidelink control channel in a non-overlapping frequency.

In a seventeenth aspect, alone or in combination with one or more of the first through sixteenth aspects, process 800 includes adjusting a reference signal configuration in connection with cancelling the transmission of the physical sidelink control channel.

In an eighteenth aspect, alone or in combination with one or more of the first through seventeenth aspects, transmitting on the communication resource in accordance with the sidelink cancellation indication and the rule associated with the overlap with the physical sidelink control channel comprises canceling transmission of one or more symbols of the physical sidelink control channel.

In a nineteenth aspect, alone or in combination with one or more of the first through eighteenth aspects, process 800 includes canceling transmission of one or more symbols of a physical sidelink shared channel in connection with cancelling the transmission of the one or more symbols of the physical sidelink control channel.

In a twentieth aspect, alone or in combination with one or more of the first through nineteenth aspects, the one or more symbols comprise all symbols of the physical sidelink control channel or all overlapping symbols of the physical sidelink control channel.

In a twenty-first aspect, alone or in combination with one or more of the first through twentieth aspects, transmitting on the communication resource in accordance with the sidelink cancellation indication and the rule associated with the overlap with the physical sidelink control channel comprises transmitting on the communication resource based at least in part on a characteristic of the overlap with the physical sidelink control channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
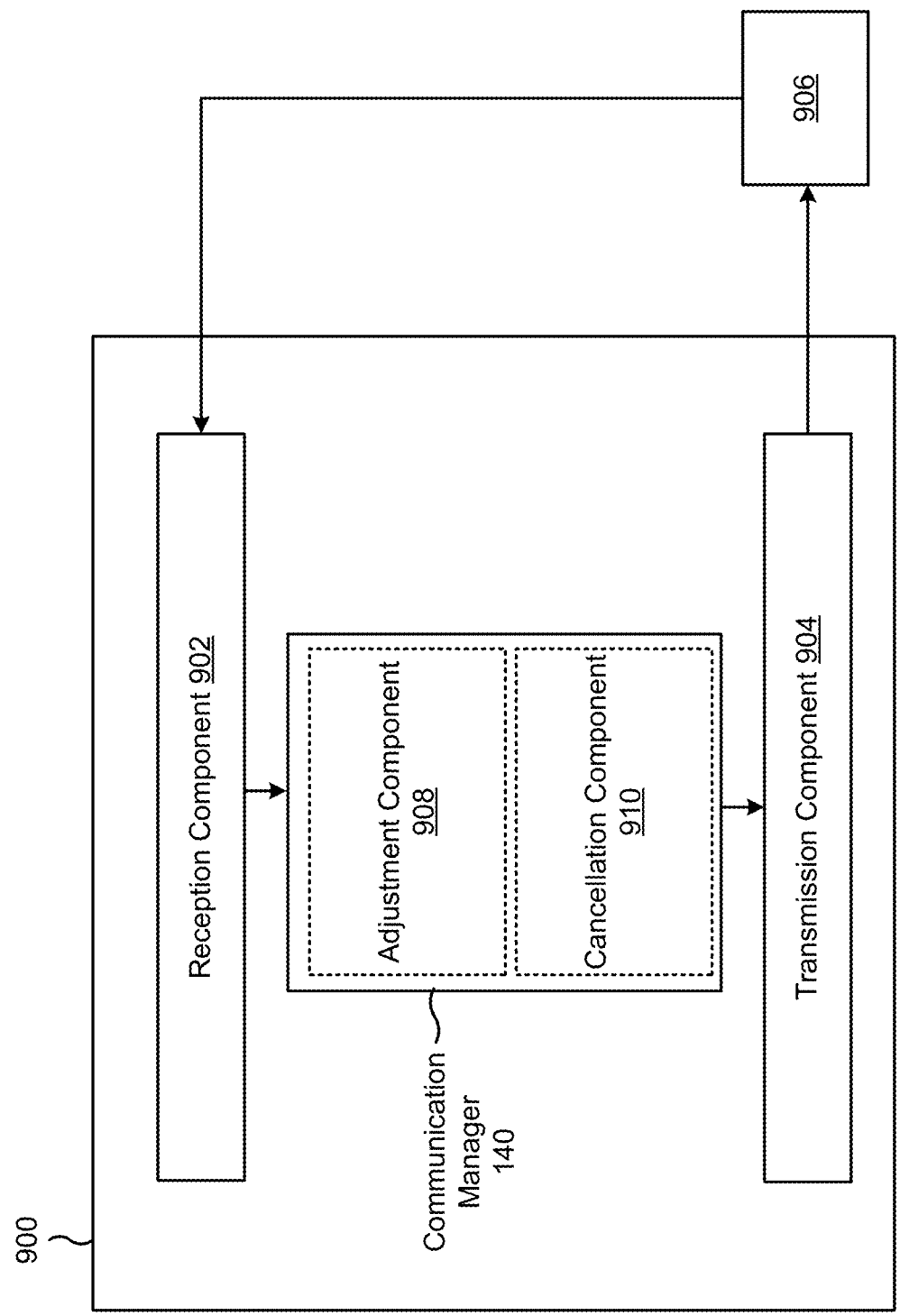
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an adjustment component 908 or a cancellation component 910, among other examples.

In some aspects, the apparatus 900 may be configured to perform one or more operations described herein in connection with FIGS. 7A-7D. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive downlink control information including a sidelink cancellation indication indicating a cancellation of a communication in a communication resource that has an overlap with a physical sidelink control channel. The transmission component 904 may transmit on the communication resource in accordance with the sidelink cancellation indication and a rule associated with the overlap with the physical sidelink control channel.

The transmission component 904 may transmit the physical sidelink control channel using another communication resource.

The adjustment component 908 may adjust a transmit power or a reference signal configuration in one or more resource elements in connection with transmitting on the communication resource.

The adjustment component 908 may adjust at least one of a demodulation reference signal sequence, an automatic gain control configuration, or a physical sidelink shared channel transmission in connection with delaying the transmission of the physical sidelink control channel.

The transmission component 904 may transmit the physical sidelink control channel in a non-overlapping frequency.

The adjustment component 908 may adjust a reference signal configuration in connection with cancelling the transmission of the physical sidelink control channel.

The cancellation component 910 may cancel transmission of one or more symbols of a physical sidelink shared channel in connection with cancelling the transmission of the one or more symbols of the physical sidelink control channel.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving downlink control information including a sidelink cancellation indication indicating a cancellation of a communication in a communication resource that has an overlap with a physical sidelink control channel; and transmitting on the communication resource in accordance with the sidelink cancellation indication and a rule associated with the overlap with the physical sidelink control channel.

Aspect 2: The method of Aspect 1, wherein transmitting on the communication resource in accordance with the sidelink cancellation indication and the rule associated with the overlap with the physical sidelink control channel comprises: transmitting on the communication resource such that one or more symbols of the physical sidelink control channel are not cancelled.

Aspect 3: The method of any of Aspects 1 to 2, wherein transmitting on the communication resource in accordance with the sidelink cancellation indication and the rule associated with the overlap with the physical sidelink control channel comprises: cancelling at least one of: a physical sidelink control channel transmission, a physical sidelink shared channel transmission, or an automatic gain control transmission.

Aspect 4: The method of any of Aspects 1 to 3, wherein transmitting on the communication resource in accordance with the sidelink cancellation indication and the rule associated with the overlap with the physical sidelink control channel comprises: cancelling a subchannel or resource block that includes the physical sidelink control channel.

Aspect 5: The method of Aspect 4, wherein cancelling the subchannel or resource block comprises: cancelling a transmission on a lowest subchannel or resource block that includes the physical sidelink control channel.

Aspect 6: The method of any of Aspects 4 to 5, wherein cancelling the subchannel or resource block comprises: cancelling one or more symbols occurring before the physical sidelink control channel in connection with a timing of decoding of the sidelink cancellation indication.

Aspect 7: The method of any of Aspects 4 to 6, wherein cancelling the subchannel or resource block comprises:

transmitting one or more symbols occurring before the physical sidelink control channel in connection with a timing of decoding of the sidelink cancellation indication.

Aspect 8: The method of Aspect 1, wherein transmitting on the communication resource in accordance with the sidelink cancellation indication and the rule associated with the overlap with the physical sidelink control channel comprises: cancelling a complete physical sidelink control channel.

Aspect 9: The method of Aspect 8, further comprising: transmitting the physical sidelink control channel using another communication resource.

Aspect 10: The method of any of Aspects 1 to 9, further comprising: adjusting a transmit power or a reference signal configuration in one or more resource elements in connection with transmitting on the communication resource.

Aspect 11: The method of any of Aspects 1 to 10, wherein transmitting on the communication resource in accordance with the sidelink cancellation indication and the rule associated with the overlap with the physical sidelink control channel comprises: forgoing transmission of the physical sidelink control channel on a first subchannel; and shifting transmissions on one or more second subchannels within a physical sidelink control channel allocation in connection with forgoing the transmission of the physical sidelink control channel on the first subchannel.

Aspect 12: The method of any of Aspects 1 to 11, wherein transmitting on the communication resource in accordance with the sidelink cancellation indication and the rule associated with the overlap with the physical sidelink control channel comprises: delaying transmission of the physical sidelink control channel.

Aspect 13: The method of Aspect 12, wherein transmitting on the communication resource in accordance with the sidelink cancellation indication and the rule associated with the overlap with the physical sidelink control channel comprises: transmitting the physical sidelink control channel on one or more non-overlapping symbols.

Aspect 14: The method of any of Aspects 12 to 13, further comprising: adjusting at least one of a demodulation reference signal sequence, an automatic gain control configuration, or a physical sidelink shared channel transmission in connection with delaying the transmission of the physical sidelink control channel.

Aspect 15: The method of any of Aspects 1 to 14, wherein transmitting on the communication resource in accordance with the sidelink cancellation indication and the rule associated with the overlap with the physical sidelink control channel comprises: cancelling transmission of the physical sidelink control channel in an overlapping frequency identified by the sidelink cancellation indication.

Aspect 16: The method of Aspect 15, wherein the cancelling of the transmission of the physical sidelink control channel is a partial cancellation or a full cancellation based at least in part on a characteristic of the overlapping frequency.

Aspect 17: The method of any of Aspects 15 to 16, further comprising: transmitting the physical sidelink control channel in a non-overlapping frequency.

Aspect 18: The method of any of Aspects 15 to 17, further comprising: adjusting a reference signal configuration in connection with cancelling the transmission of the physical sidelink control channel.

Aspect 19: The method of any of Aspects 1 to 18, wherein transmitting on the communication resource in accordance with the sidelink cancellation indication and the rule associated with the overlap with the physical sidelink control channel comprises: cancelling transmission of one or more symbols of the physical sidelink control channel.

Aspect 20: The method of Aspect 19, further comprising: cancelling transmission of one or more symbols of a physical sidelink shared channel in connection with cancelling the transmission of the one or more symbols of the physical sidelink control channel.

Aspect 21: The method of any of Aspects 19 to 20, wherein the one or more symbols comprise all symbols of the physical sidelink control channel or all overlapping symbols of the physical sidelink control channel.

Aspect 22: The method of any of Aspects 1 to 21, wherein transmitting on the communication resource in accordance with the sidelink cancellation indication and the rule associated with the overlap with the physical sidelink control channel comprises: transmitting on the communication resource based at least in part on a characteristic of the overlap with the physical sidelink control channel.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive downlink control information including a sidelink cancellation indication indicating a cancellation of a communication in a communication resource that has an overlap with a physical sidelink control channel; and
      transmit, based at least in part on identifying that the communication resource has the overlap with the physical sidelink control channel, on the communication resource in accordance with the sidelink cancellation indication and a rule associated with sidelink cancellation indications that apply to communication resources that overlap with the physical sidelink control channel.

2. The UE of claim 1, wherein the one or more processors, to transmit on the communication resource in accordance with the sidelink cancellation indication and the rule associated with the overlap with the physical sidelink control channel, are configured to:
   transmit on the communication resource such that one or more symbols of the physical sidelink control channel are not cancelled.

3. The UE of claim 1, wherein the one or more processors, to transmit on the communication resource in accordance with the sidelink cancellation indication and the rule associated with the overlap with the physical sidelink control channel, are configured to:
   cancel at least one of: a physical sidelink control channel transmission, a physical sidelink shared channel transmission, or an automatic gain control transmission.

4. The UE of claim 1, wherein the one or more processors, to transmit on the communication resource in accordance with the sidelink cancellation indication and the rule associated with the overlap with the physical sidelink control channel, are configured to:
   cancel a subchannel or a resource block that includes the physical sidelink control channel.

5. The UE of claim 4, wherein the one or more processors, to cancel the subchannel or the resource block, are configured to:
   cancel a transmission on a lowest subchannel or a lowest resource block that includes the physical sidelink control channel.

6. The UE of claim 4, wherein the one or more processors, to cancel the subchannel or the resource block, are configured to:
   cancel one or more symbols occurring before the physical sidelink control channel in connection with a timing of decoding of the sidelink cancellation indication.

7. The UE of claim 4, wherein the one or more processors, to cancel the subchannel or the resource block, are configured to:
   transmit one or more symbols occurring before the physical sidelink control channel in connection with a timing of decoding of the sidelink cancellation indication.

8. The UE of claim 1, wherein the one or more processors, to transmit on the communication resource in accordance with the sidelink cancellation indication and the rule associated with the overlap with the physical sidelink control channel, are configured to:
   cancel a complete physical sidelink control channel.

9. The UE of claim 8, wherein the one or more processors are further configured to:
   transmit the physical sidelink control channel using another communication resource.

10. The UE of claim 1, wherein the one or more processors are further configured to:
    adjust a transmit power or a reference signal configuration in one or more resource elements in connection with transmitting on the communication resource.

11. The UE of claim 1, wherein the one or more processors, to transmit on the communication resource in accordance with the sidelink cancellation indication and the rule associated with the overlap with the physical sidelink control channel, are configured to:
    forgo a transmission of the physical sidelink control channel on a first subchannel; and
    shift transmissions on one or more second subchannels within a physical sidelink control channel allocation in connection with forgoing the transmission of the physical sidelink control channel on the first subchannel.

12. The UE of claim 1, wherein the one or more processors, to transmit on the communication resource in accordance with the sidelink cancellation indication and the rule associated with the overlap with the physical sidelink control channel, are configured to:

delay a transmission of the physical sidelink control channel.

13. The UE of claim 12, wherein the one or more processors, to transmit on the communication resource in accordance with the sidelink cancellation indication and the rule associated with the overlap with the physical sidelink control channel, are configured to:
   transmit the physical sidelink control channel on one or more non-overlapping symbols.

14. The UE of claim 12, wherein the one or more processors are further configured to:
   adjust at least one of a demodulation reference signal sequence, an automatic gain control configuration, or a physical sidelink shared channel transmission in connection with delaying the transmission of the physical sidelink control channel.

15. The UE of claim 1, wherein the one or more processors, to transmit on the communication resource in accordance with the sidelink cancellation indication and the rule associated with the overlap with the physical sidelink control channel, are configured to:
   cancel a transmission of the physical sidelink control channel in an overlapping frequency identified by the sidelink cancellation indication.

16. The UE of claim 15, wherein the canceling of the transmission of the physical sidelink control channel is a partial cancellation or a full cancellation based at least in part on a characteristic of the overlapping frequency.

17. The UE of claim 15, wherein the one or more processors are further configured to:
   transmit the physical sidelink control channel in a non-overlapping frequency.

18. The UE of claim 15, wherein the one or more processors are further configured to:
   adjust a reference signal configuration in connection with the canceling of the transmission of the physical sidelink control channel.

19. The UE of claim 1, wherein the one or more processors, to transmit on the communication resource in accordance with the sidelink cancellation indication and the rule associated with the overlap with the physical sidelink control channel, are configured to:
   cancel a transmission of one or more symbols of the physical sidelink control channel.

20. The UE of claim 19, wherein the one or more processors are further configured to:
   cancel a transmission of one or more symbols of a physical sidelink shared channel in connection with canceling the transmission of the one or more symbols of the physical sidelink control channel.

21. The UE of claim 19, wherein the one or more symbols comprise all symbols of the physical sidelink control channel or all overlapping symbols of the physical sidelink control channel.

22. The UE of claim 1, wherein the one or more processors, to transmit on the communication resource in accordance with the sidelink cancellation indication and the rule associated with the overlap with the physical sidelink control channel, are configured to:
   transmit on the communication resource based at least in part on a characteristic of the overlap with the physical sidelink control channel.

23. A method of wireless communication performed by a user equipment (UE), comprising:
   receiving downlink control information including a sidelink cancellation indication indicating a cancellation of a communication in a communication resource that has an overlap with a physical sidelink control channel; and
   transmitting, based at least in part on identifying that the communication resource has the overlap with the physical sidelink control channel, on the communication resource in accordance with the sidelink cancellation indication and a rule associated with sidelink cancellation indications that apply to communication resources that overlap with the physical sidelink control channel.

24. The method of claim 23, wherein transmitting on the communication resource in accordance with the sidelink cancellation indication and the rule associated with the overlap with the physical sidelink control channel comprises:
   transmitting on the communication resource such that one or more symbols of the physical sidelink control channel are not cancelled.

25. The method of claim 23, wherein transmitting on the communication resource in accordance with the sidelink cancellation indication and the rule associated with the overlap with the physical sidelink control channel comprises:
   canceling at least one of: a physical sidelink control channel transmission, a physical sidelink shared channel transmission, or an automatic gain control transmission.

26. The method of claim 23, wherein transmitting on the communication resource in accordance with the sidelink cancellation indication and the rule associated with the overlap with the physical sidelink control channel comprises:
   canceling a subchannel or a resource block that includes the physical sidelink control channel.

27. The method of claim 26, wherein canceling the subchannel or the resource block comprises:
   canceling a transmission on a lowest subchannel or a lowest resource block that includes the physical sidelink control channel.

28. The method of claim 26, wherein canceling the subchannel or the resource block comprises:
   canceling one or more symbols occurring before the physical sidelink control channel in connection with a timing of decoding of the sidelink cancellation indication.

29. A non-transitory computer-readable medium storing a set of instructions for wireless communication, the set of instructions comprising:
   one or more instructions that, when executed by one or more processors of a user equipment (UE), cause the UE to:
      receive downlink control information including a sidelink cancellation indication indicating a cancellation of a communication in a communication resource that has an overlap with a physical sidelink control channel; and
      transmit, based at least in part on identifying that the communication resource has the overlap with the physical sidelink control channel, on the communication resource in accordance with the sidelink cancellation indication and a rule associated with sidelink cancellation indications that apply to communication resources that overlap with the physical sidelink control channel.

30. An apparatus for wireless communication, comprising:

means for receiving downlink control information including a sidelink cancellation indication indicating a cancellation of a communication in a communication resource that has an overlap with a physical sidelink control channel; and means for transmitting, based at least in part on identifying that the communication resource has the overlap with the physical sidelink control channel, on the communication resource in accordance with the sidelink cancellation indication and a rule associated with sidelink cancellation indications that apply to communication resources that overlap with the physical sidelink control channel.

\* \* \* \* \*